United States Patent

[11] 3,620,361

[72] Inventors Hirotomo Fugiwara; Takuya Arai; Noboru Miyamoto, all of Tokyo, Japan

[21] Appl. No. 864,713
[22] Filed Oct. 8, 1969
[45] Patented Nov. 16, 1971
[73] Assignee Fuji Photo Film Co., Ltd. Kanagawa, Japan
[32] Priority Oct. 11, 1968
[33] Japan
[31] 43/88684

[54] CASING FOR A TAPE CARTRIDGE
1 Claim, 3 Drawing Figs.

[52] U.S. Cl. .......... 206/1 R, 206/52 F, 220/31 S

[51] Int. Cl. .......... B65d 43/16, B65d 85/67

[50] Field of Search .......... 206/1, 52 F, 52 R, 59 E, 45.13; 220/31 S; 242/71.2

[56] References Cited

UNITED STATES PATENTS

| | | | |
|---|---|---|---|
| Des. 218,922 | 10/1970 | Devore et al. .......... | 206/52 F |
| 2,808,148 | 10/1957 | Kerney .......... | 206/45.13 |
| 3,272,325 | 9/1966 | Schoenmakers .......... | 206/52 F |
| 3,532,211 | 10/1970 | Gellert .......... | 206/52 F |

*Primary Examiner*—William T. Dixson, Jr.
*Attorney*—Sughrue, Rothwell, Mion, Zinn & Macpeak

ABSTRACT: A rectangular casing for holding a tape cartridge has a hinged cover which in turn has projections for engagement with the tape core in order to hold the tape core in position. The projections are provided on the back of the cover at such positions that projections hold the tape core regardless of the direction the tape cartridge may be put in the casing.

INVENTORS
TAKUYA ARAI
HIROTOMO FUGIWARA
NOBORU MIYAMOTO
BY Sughrue, Rothwell, Mion, Zinn & MacPeak
ATTORNEYS

CASING FOR A TAPE CARTRIDGE

BACKGROUND OF THE INVENTION

1. Field of the Invention

This invention relates to a casing for containing a tape cartridge.

2. Description of the Prior Art

It is well known in conventional cartridge casings to provide the casing with a couple of projections for preventing the tape from getting loose during carrying or handling. In such conventional casings, because of the position of the projections and the shape of the casing, the orientation of the cartridge to be contained is limited to one direction. For casings of the type with the tape cartridge tape exposing front opening facing forward, the cartridge could not be placed into the casing with the front opening facing backwards. Further, some conventional casings have the disadvantage that the cover cannot be opened when the casing is positioned upside down and that the cartridge cannot be removed when in the upside down position.

SUMMARY OF THE INVENTION

This invention provides a casing for a tape cartridge which has at least one projection on the back of the casing cover for preventing the wound tape from loosening therein. The position of the projections on the back of the cover are such that the cartridge can be placed in the casing from multiple directions. That is, the tape core is brought into engagement with the projections regardless of the direction of orientation of the cartridge within the casing.

The present invention provides a casing for holding tape cartridges inserted from any direction. The present invention also provides a casing for holding tape cartridges which can be opened and the cartridge removed, even if the casing is upside down.

DESCRIPTION OF THE PREFERRED EMBODIMENT

Figures 1, 3:
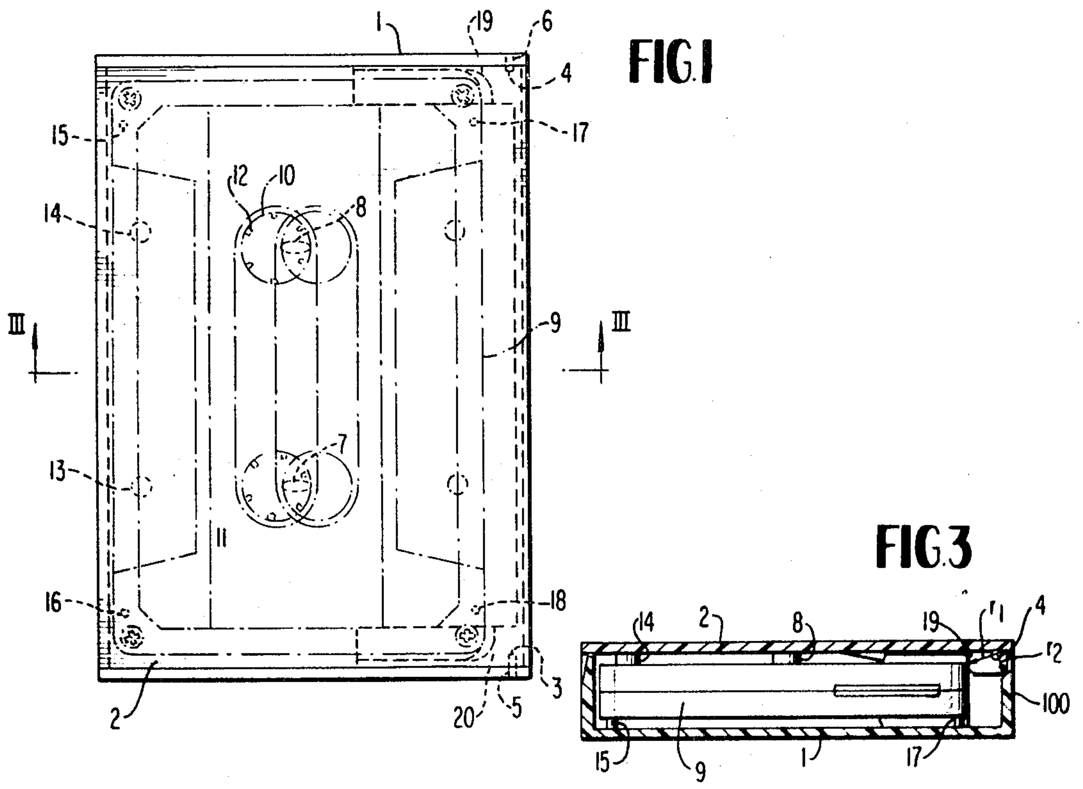
FIG. 1 is a plan view of the tape cartridge casing in accordance with the present invention.
FIG. 3 is a cross-sectional view of the casing in FIG. 1 taken along lines III—III.
Figure 2:
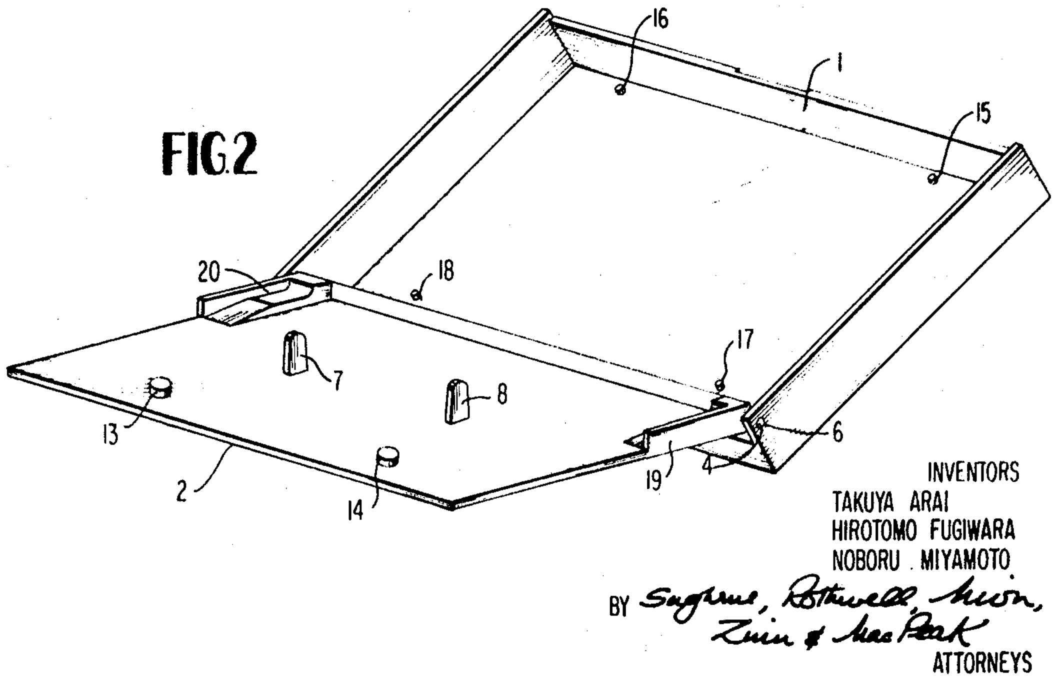
FIG. 2 is a perspective view thereof with the cover opened.

Now an embodiment of the casing in accordance with the present invention will be described in detail referring to the drawings.

The casing in accordance with the present invention comprises a case body 1 and a plate-shaped cover 2 coupled to the case body 1. The cover 2 is hinged to the case body 1 by means of a pair of pins 3, 4 provided at the opposite ends of the cover 2 near one edge thereof within pin holes 5, 6 provided on the case body 1.

On the back face of the cover 2 are provided a pair of projections 7, 8 for preventing the tape from loosening. The projections 7, 8 are so positioned that they may engage the tape cores of the tape cartridge when the cartridge is put into the casing and the cover is closed. The case body 1 and the cover 2 are preferably made by plastic moulding with projections 7, 8 of course moulded together with the cover 2. The position of the projections 7 and 8 are selected so that the cartridge can be positioned in the casing in any direction and contained therein. This specific position is determined by finding the position in the casing where one position of the cores of the cartridge overlaps with another position of the cartridge when put in the casing in the opposite direction. Thus, the projections will engage the cores of the cartridge regardless of direction the cartridge faces when placed into the casing. In the case of the present invention, the cores 10, 11 of the tape cartridge are of cylindrical shape and have a plurality of inwardly projected teeth on the cylindrical internal surface. Such types of cores are most popularly employed in conventional magnetic tape cartridges.

The cover 2 is provided with a pair of pins 13, 14 on the back surface thereof for insertion into pin holes at the front portion of the cartridge. (In the drawing, the pins are not inserted into the pinholes, since the cartridge is reversely positioned within the casing.) On the inner surface of the body 1, pins 15, 16, 17 and 18 are provided for holding the cartridge at a slightly floating position. By means of these pins and projections, the cartridge 9 is contained in the casing with all six faces thereof spaced from the inner surfaces of the casing, and thereby protected from frictional scratches normally made by vibration or the like while carrying the casing.

In the vicinity of the hinged portion of the cover 2 also, a pair of protrusions 19, 20 are provided for positioning the cartridge at a fixed position within the casing. These protrusions are so constructed that the radius $r_1$ from the hinge axis to the surface of 19, 20 which contact the edge of the cartridge, may not be smaller than the radius $r_2$ from the same hinge axis to the surface of the cover which is in contact with the rear wall 100 of the body 1 when the cover is closed. This is for the purpose of preventing the protrusion from engaging with the back of the cartridge 9 when opening the cover 2, with the body 1 placed below the cover 1. When the cover 2 is placed below the body 1 and the cover is opened, there is no problem of engagement of the protrusion of the cover with the back of the contained cartridge. Thus, a cartridge positioned within the casing in accordance with the present invention may be easily removed therefrom.

What is claimed is:

1. In a casing for a tape cartridge including an open, boxlike rectangular body including a shortened rear wall, a mating cover having a downwardly extending rear wall portion to enclose one end of said cartridge along with said shortened rear wall portion when said cover is in closed position, pivot pins coupling said cover rear wall portion to the sidewalls of said rectangular body, a pair of protrusions extending inwardly from said cover rear wall portion at both sides of said cover for controlling the positioning of the cartridge during loading, the protrusions being such that the radius from the pin hinge axis to the protrusion surface in contact with the adjacent edge of the cartridge is larger than the radius extending from the same axis to the end of the cover rear wall portion which contacts the rear wall of said body during closing of said cover, said cover further including a pair of projections provided on the back surface of the same, said projections being positioned such as to be brought into engagement with the tape cores of the tape cartridge loaded therein regardless of the direction of orientation of the cartridge during loading.

* * * * *